US010359521B2

(12) United States Patent
Ota et al.

(10) Patent No.: US 10,359,521 B2
(45) Date of Patent: Jul. 23, 2019

(54) RADIATION IMAGE FORMING APPARATUS

(71) Applicant: DAI NIPPON PRINTING Co., Ltd., Tokyo (JP)

(72) Inventors: Kohei Ota, Tokyo (JP); Motonori Ohno, Tokyo (JP)

(73) Assignee: DAI NIPPON PRINTING Co., Ltd., Tokyo (JP)

(*) Notice: Subject to any disclaimer, the term of this patent is extended or adjusted under 35 U.S.C. 154(b) by 0 days.

(21) Appl. No.: 15/935,097

(22) Filed: Mar. 26, 2018

(65) Prior Publication Data
US 2018/0239036 A1    Aug. 23, 2018

Related U.S. Application Data

(63) Continuation of application No. PCT/JP2016/079008, filed on Sep. 30, 2016.

(30) Foreign Application Priority Data

Sep. 30, 2015  (JP) .................. 2015-195142

(51) Int. Cl.
*G01T 1/18*   (2006.01)
*H01J 47/06*  (2006.01)
*G01T 1/24*   (2006.01)

(52) U.S. Cl.
CPC ............ *G01T 1/241* (2013.01); *G01T 1/18* (2013.01); *H01J 47/06* (2013.01)

(58) Field of Classification Search
CPC .......... G01T 1/20; G01T 1/242; G01T 1/241; G01T 1/18; G01T 1/244; H01J 47/06
See application file for complete search history.

(56) References Cited

U.S. PATENT DOCUMENTS 8,084,742 B1 * 12/2011 Nagarkar ............ G01T 1/2008
250/363.03
2002/0011571 A1 * 1/2002 Lin .................... G01T 1/2018
250/366

(Continued)

FOREIGN PATENT DOCUMENTS

JP    3354551 B2   12/2002
JP    3535045 B2    6/2004
(Continued)

OTHER PUBLICATIONS

International Search Report dated Nov. 8, 2016 for the PCT Application No. PCT/JP2016/079008.
(Continued)

*Primary Examiner* — David P Porta
(74) *Attorney, Agent, or Firm* — Typha IP LLC

(57) ABSTRACT

A radiation image forming apparatus includes a detection unit including a plurality of Compton cameras. Each of the plurality of Compton cameras including a radiation detection device that includes a plurality of pixels, each configured to detect an electron generated by the track of a recoil electron generated by Compton scattering, and is configured to output a detection signal configured to specify the position of a pixel that has detected the electron and a time when the pixel has detected the electron, and a detection module configured to detect the incident position of scattered γ rays generated by the Compton scattering. The plurality of the Compton cameras arranged annularly to surround a region in which a specimen is placed.

8 Claims, 16 Drawing Sheets

(56) References Cited

U.S. PATENT DOCUMENTS

| | | | |
|---|---|---|---|
| 2002/0134945 | A1 | 9/2002 | Tanimori et al. |
| 2013/0334523 | A1* | 12/2013 | Yamazaki ......... H01L 29/78693 |
| | | | 257/43 |
| 2016/0291174 | A1 | 10/2016 | Ishii |
| 2018/0180747 | A1* | 6/2018 | Matsuura .................. G01T 1/24 |

FOREIGN PATENT DOCUMENTS

| | | |
|---|---|---|
| JP | 2010-101666 A | 5/2010 |
| JP | 2012-154725 A | 8/2012 |
| JP | 2012-255698 A | 12/2012 |
| JP | 2015-148448 A | 8/2015 |
| JP | 2016-118426 A | 6/2016 |

OTHER PUBLICATIONS

Written Opinion dated Nov. 8, 2016 for the PCT Application No. PCT/JP2016/079008.

Written Opinion of the International Searching Authority for the PCT application No. PCT/JP2016/079008.

Extended European Search Report dated May 23, 2019 for the corresponding EP application No. 16851843.9.

Kabuki et al., "Development of Electron Tracking Compton Camera using micro pixel gas chamber for medical imaging", Nuclear Instruments and Method in Physics Research, Section A, vol. 580, No. 2, Sep. 14, 2007, pp. 1031-1035. North-Holland. Netherlands. Cited in Non-Patent Literature Document No. 1.

Holger Gottschlag, "Small Animal Positron Emission Tomography with Multi-Wire Proportional Counters", Jan. 1, 2010, Retrieved from the Internet: URL: https://d-nb. info/1007715235/34. Cited in Non-Patent Literature Document No. 1.

Islam Mohammad et at,. "An integral quality monitoring system for real-time verification of intensity modulated radiation therapy", Medical Physics, vol. 36, No. 12, Nov. 5, 2009, pp. 5420-5428. New York, United States. Cited in Non-Patent Literature Document No. 1.

\* cited by examiner

RADIATION IMAGE FORMING APPARATUS

CROSS-REFERENCE TO RELATED APPLICATIONS

This application is based upon and claims the benefit of priority from the prior Japanese Patent Application No. 2015-195142, filed on Sep. 30, 2015, and PCT International Patent Application No. PCT/JP2016/079008, filed on Sep. 30, 2016, the entire contents of which are incorporated herein by reference.

FIELD

The present invention relates to a radiation image forming apparatus.

BACKGROUND

A radiation detection device (micro pixel gas chamber (MPGC)) using gas amplification by pixel-type electrodes has been studied. A radiation detection device using MPGC is combined with a detection module to form a Compton camera. The Compton camera is featured to implement imaging of a detection region which conventional detectors have not been able to satisfactorily implement.

Refer to Japanese Patent Application Laid-Open No. 2012-255698 and Japanese Patent Application Laid-Open No. 2012-154725 for information about the structure of a radiation detection device using MPGC.

SUMMARY

According to an embodiment of the present invention, a radiation image forming apparatus including a detection unit including a plurality of Compton cameras. Each of the plurality of Compton cameras including a radiation detection device that includes a plurality of pixels, each configured to detect an electron generated by the track of a recoil electron generated by Compton scattering, and is configured to output a detection signal configured to specify the position of a pixel that has detected the electron and a time when the pixel has detected the electron, and a detection module configured to detect the incident position of scattered γ rays generated by the Compton scattering. The plurality of the Compton cameras arranged annularly to surround a region in which a specimen is placed.

According to an embodiment of the present invention, a radiation image forming apparatus including a first detection unit including a plurality of first Compton cameras and a second detection unit each including a plurality of second Compton cameras. Each of the plurality of first Compton cameras and the plurality of second Compton cameras including a radiation detection device that includes a plurality of pixels, each configured to detect an electron generated by the track of a recoil electron generated by Compton scattering, and is configured to output a detection signal configured to specify the position of a pixel that has detected the electron and a time when the pixel has detected the electron, and a detection module configured to detect the incident position of scattered γ rays generated by the Compton scattering. The plurality of first Compton cameras of the first detection unit is arranged annularly to surround a specimen, and the plurality of second Compton cameras of the second detection unit. The second detection unit is annularly to surround the first detection unit.

DESCRIPTION OF EMBODIMENTS

Figure 1:
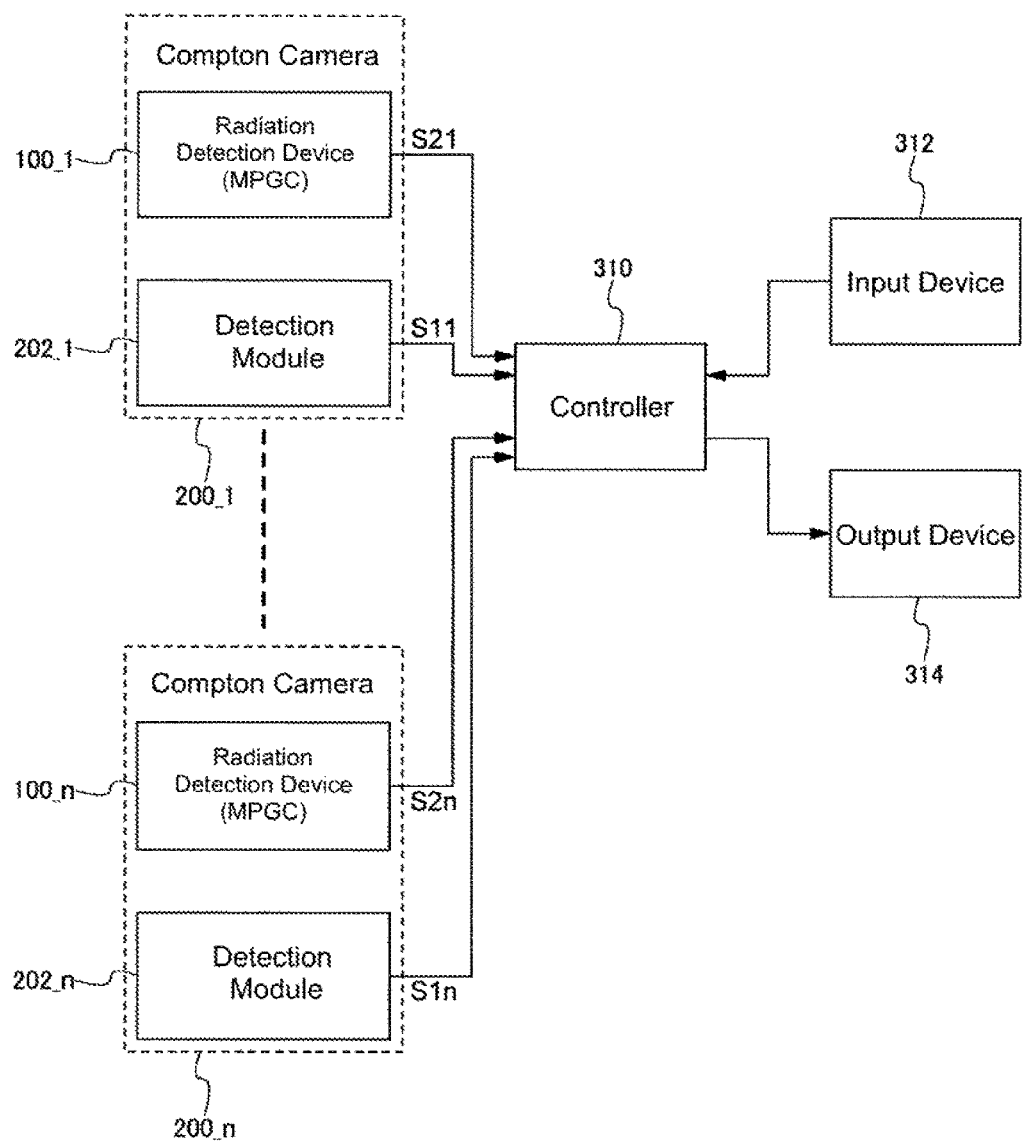
FIG. 1 is a block diagram showing the arrangement of an imaging device.

A radiation image forming apparatus according to the present invention will be described in detail below with reference to the accompanying drawings. Note that the radiation image forming apparatus according to the present invention is not limited to the following embodiments and can be variously modified and embodied. In the description of the embodiments disclosed in this specification, the same reference numerals denote the same constituent elements. Furthermore, for the sake of descriptive convenience, dimensional ratios in the accompanying drawings are sometimes different from actual ratios, and an illustration of some components is sometimes omitted from the drawings.

FIG. 1 shows the arrangement of a radiation image forming apparatus according to this embodiment. The radiation image forming apparatus includes a plurality of Compton cameras $200\_1$ to $200\_n$ (n is an integer), a controller 310, an input device 312, and an output device 314.

The controller 310 reconstructs a three-dimensional image by computation based on detection signals (S11, ..., S1n and S21, ..., S2n, where n is an integer (the same applies hereinafter)) output from the Compton cameras $200\_1$ to $200\_n$ and specifies the position of a specimen (radiation source). The operator can instruct the controller 310 by using the input device 312. The three-dimensional image reconstructed by the controller 310 is presented to the operator via the output device 314.

Figure 2A:
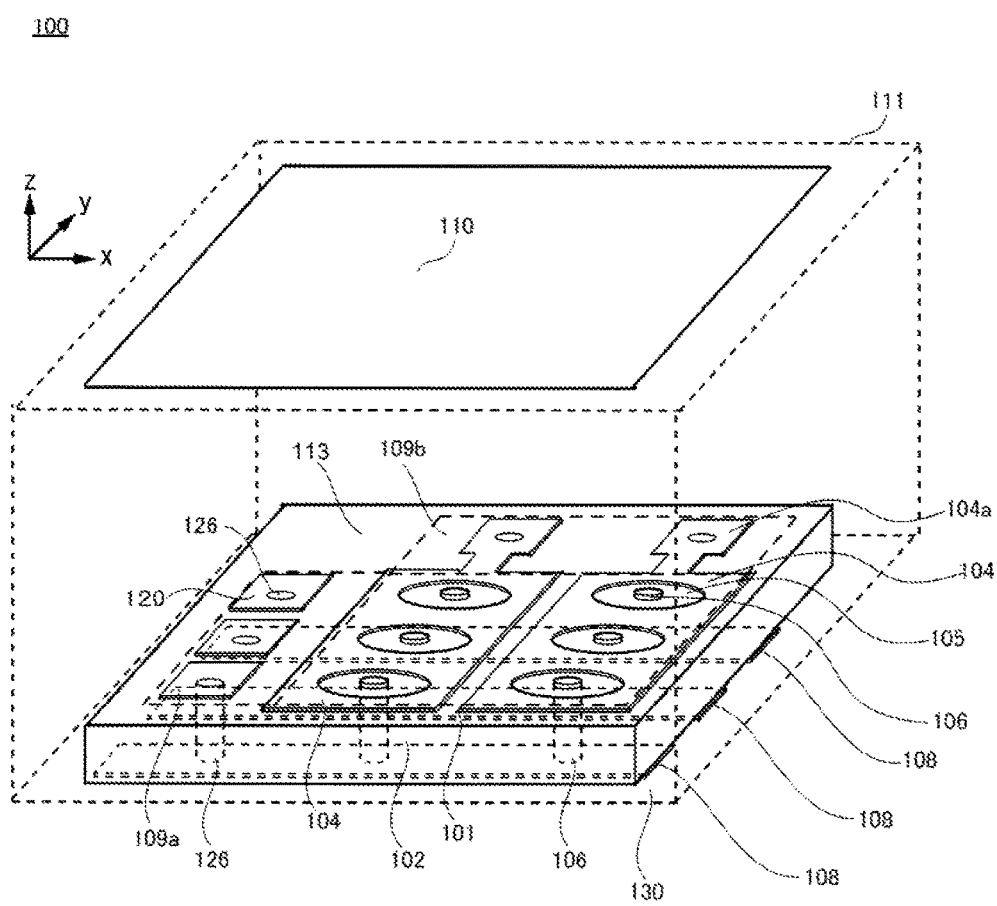
FIG. 2A is a view showing the schematic arrangement of a detection element of a radiation detection device.

FIG. 2A shows the schematic arrangement of a detection element 113 of a radiation detection device 100. The radiation detection device 100 includes the detection element 113 having a pixel electrode portion 101 and connecting terminal portions 109 (109a and 109b) and a drift electrode 110. The detection element 113 and the drift electrode 110 are provided in a chamber 111. The detection element 113 is an element including the pixel electrode portion 101 and the connecting terminal portions 109 (109a and 109b).

The pixel electrode portion 101 of the radiation detection device 100 includes an insulating member 102, cathode electrodes 104, anode electrodes 106, anode electrode patterns 108, and a substrate 130. The plurality of cathode electrodes 104 are arranged on the first surface of the insulating member 102. The cathode electrodes 104 have a plurality of opening portions 105. The cathode electrode 104 is formed into a strip shape and hence is also called a cathode strip electrode.

The anode electrode 106 is placed in a through hole provided in the insulating member 102 from the second surface on the opposite side to the first surface of the insulating member 102. In this embodiment, the tip ends of the anode electrodes 106 are exposed in the plurality of opening portions 105 in the cathode electrode 104. Referring to FIG. 2A, each anode electrode 106 has a shape with its tip end being exposed in a corresponding one of the opening portions 105. However, each anode electrode 106 may be shaped such that its tip end is not exposed in a corresponding one of the opening portions 105 (including an anode electrode shaped such that its tip end is almost flush with the upper surface of the insulating member 102 (the upper surface of the through hole) or its tip end is located inside the through hole of the insulating member 102).

The plurality of anode electrodes 106 placed in the plurality of opening portions 105 of one cathode electrode 104 are respectively connected to the plurality of anode electrode patterns 108. The anode electrode pattern 108 extends to the connecting terminal portion 109a. The direction in which the cathode electrode 104 extends is almost vertical to the direction in which the anode electrode pattern 108 extends. This embodiment has exemplified the mode in which the anode electrodes 106 and the anode electrode patterns 108 are separately provided and are electrically connected to each other. However, this is not exhaustive, and the anode electrodes 106 and the anode electrode patterns 108 to which the respective anode electrodes 106 are connected may be integrally formed. Each anode electrode pattern 108 is formed into a strip shape and hence is also called an anode strip pattern.

The connecting terminal portion 109a includes a via hole 126 connected to the anode electrode pattern 108 and a metal layer 120. The metal layer 120 is connected to the via hole 126. Although FIG. 2A shows a case in which the anode electrode patterns 108 and the via holes 126 are separately formed, this is not exhaustive, and the anode electrode patterns 108 and the via holes 126 may be formed from the same metal material. The wiring terminal portion 109b includes an electrode 104a which is an extended portion of the cathode electrode 104.

With the above arrangement, the radiation detection device 100 has the anode electrodes 106 arranged in a matrix pattern on the pixel electrode portion 101. That is, the radiation detection device 100 has a plurality of "pixels" arranged, each including the anode electrode 106 and a portion of the cathode electrode 104. In this arrangement, a voltage is applied between each cathode electrode 104 and the corresponding anode electrode 106 to form an electric field.

The drift electrode 110 is placed to face the pixel electrode portion 101. The cathode electrodes 104 of the pixel electrode portion 101 are grounded, and a voltage is applied between the drift electrode 110 and each cathode electrode 104 to from an electric field.

The chamber 111 encloses the pixel electrode portion 101, the connecting terminal portions 109, and the drift electrode 110. A gas mixture of a rare gas such as argon or xenon and a molecular gas such as ethane or methane is introduced into the chamber 111.

Figure 2B:
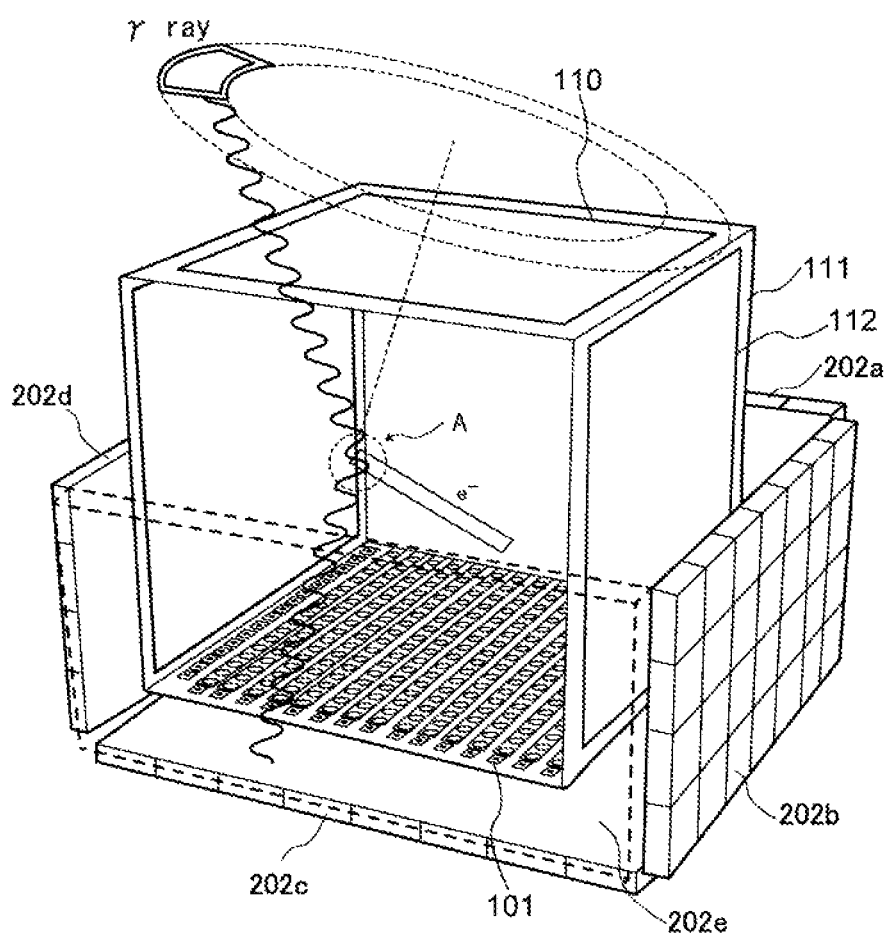
FIG. 2B is a view showing the schematic arrangement of a Compton camera.

FIG. 2B shows the schematic arrangement of a detection module 202. As shown in FIG. 2B, a Compton camera 200 according to this embodiment includes the radiation detection device 100 using MPGC and the detection module 202. In this case, the detection module 202 also includes a photomultiplier tube that converts emitted light when a scattered γ ray enters the detection module into an electrical signal. As shown in FIG. 2B, the detection module 202 is installed so as to surround the radiation detection device 100 from five directions. Referring to FIG. 2B, the detection module has five portions 202a to 202e. Note, however, it is not essential that the detection module 202 is installed to surround the radiation detection device 100 from five directions.

The chamber 111 is attached to the radiation detection device 100. A gas mixture of a rare gas such as argon or xenon and an alkane gas (a chain saturate hydrocarbon represented by the general formula $C_nH_{2n+2}$) at room temperature such as ethane or methane or a gas having a quenching effect (quenching gas) including carbon dioxide is introduced into the chamber 111. A gas or gases to be mixed with a rare gas may include either or both of a gas such as ethane or methane and a gas having a quenching effect including carbon dioxide. The pixel electrode portion 101 on which a plurality of pixels is two-dimensionally laid out is provided on the bottom surface of the chamber 111. The drift electrode 110 is provided on the upper surface of the chamber 111. Drift cages 112 are provided on side surfaces of the chamber 111. The drift cages 112 are provided to homogenize the electric field distribution between the drift electrode 110 and the pixel electrode portion 101.

The following description concerns the principle of the Compton camera 200. First of all, when a γ ray externally enters the radiation detection device 100, the incident γ ray collides with a gas in the chamber 111 and is scattered at a certain probability. Reference symbol "A" in FIG. 2B denotes a collision position. The scattered γ ray whose propagation direction is changed by the collision is transmitted through the radiation detection device 100 and enters the detection module 202. When the scattered γ ray enters the detection module 202, light emission occurs. A photomultiplier tube then converts this emitted light into an electrical signal.

On the other hand, the gas in the chamber 111 which has collided with the incident γ ray emits a recoil electron e⁻ (charged particle) from the position denoted by reference symbol "A" in a predetermined direction. An electron cloud is then generated along the track of the recoil electron. The electrons constituting the electron cloud are attracted to the pixel electrode portion 101 due to an electric field between the drift electrode 110 and the pixel electrode portion 101. An electron that has been attracted collides with the gas to ionize the gas. Ionized electrons proliferate in an avalanche-like manner and are detected by the pixel electrode portion 101. The electrical signal obtained in this manner corresponds to the detection signal S1n shown in FIG. 1, and information representing the incident position and time of a scattered γ ray is provided to the controller 310. The detection signal S2n is a signal that makes it possible to specify the position of a pixel that has detected the electron and the time when the pixel has detected the electron.

Note that the time between the instant when a scattered γ ray enters the detection module 202 and the instant when an electron is detected by the pixel electrode portion 101 makes it possible to calculate the distance from the pixel electrode portion 101 to the position at which an electron cloud is generated (the position in the z direction).

Figure 2C:
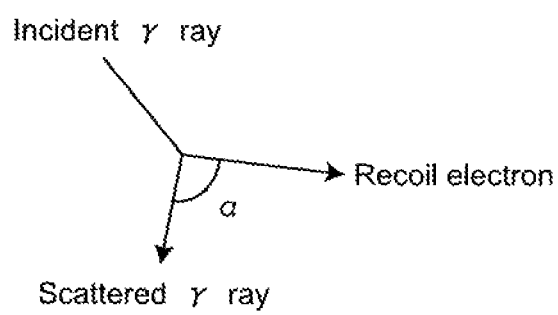
FIG. 2C a view for explaining the relationship between an incident γ ray, a scattered γ ray, and a recoil electron.

The controller 310 is triggered by the activation of the detection signal S1n (the incidence of a scattered γ ray on the scintillator) to chronologically analyze the detection signal S2n and calculate the track of a recoil electron by using the position of a pixel that has detected an electron and the time when the pixel has detected the electron (to be sometimes referred to as a detection time hereinafter). The detection time (to be sometimes referred to as a drift time hereinafter) corresponds to the time from the instant when the controller 310 is triggered to the instant when an electron is detected by the pixel electrode portion 101. Calculating also an angle αα shown in FIG. 2C can specify the direction in which the incident γ ray has entered.

Figure 3:
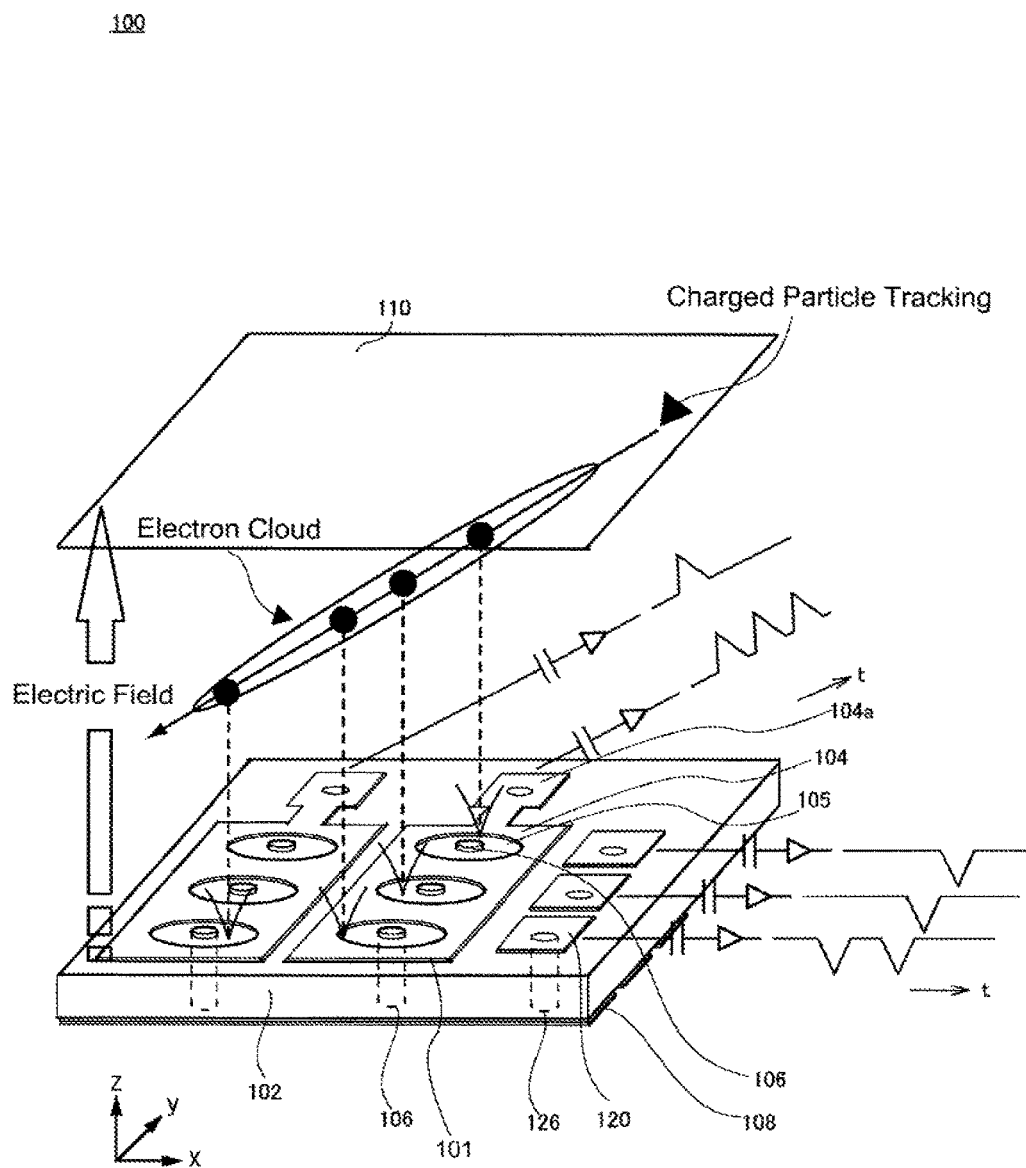
FIG. 3 is a view showing the schematic arrangement of a radiation detection device.

As shown in FIG. 3, the pixel electrode portion 101 includes the insulating member 102, the cathode electrodes 104, the anode electrodes 106, and the anode electrode patterns 108.

The plurality of cathode electrodes 104 extend in the y direction on the upper surface of the insulating member 102. The cathode electrode 104 is provided with the plurality of opening portions 105. The upper surface of the insulating member 102 is exposed in the opening portions 105.

The anode electrodes 106 extend from the reverse surface of the insulating member 102 and penetrate through the insulating member 102 in the z direction. The tip ends of the anode electrodes 106 are exposed in the plurality of opening portions 105.

The plurality of anode electrodes 106 arrayed in the y direction are respectively connected to the different anode electrode patterns 108. The plurality of anode electrode patterns 108 extend in the x direction on the reverse surface of the insulating member 102. The y direction in which the cathode electrodes 104 extend is almost perpendicular to the x direction in which the anode electrode patterns 108 extend. This embodiment has exemplified the mode in which the anode electrodes 106 and the anode electrode patterns 108 are separately provided and are electrically connected to each other. However, this is not exhaustive, and the anode electrodes 106 and the anode electrode patterns 108 may be integrally formed.

A voltage is applied between the cathode electrode 104 and the anode electrode 106 to form an electric field. The anode electrode 106 captures an electron attracted to the pixel electrode portion 101 due to this electric field. This pixel then detects the electron.

The drift electrode 110 has an xy plane is separated from the xy plane forming the pixel electrode portion 101 by a predetermined distance in the z direction. A voltage is applied between the drift electrode 110 and the cathode electrode 104 and the anode electrode 106 to form an electric field.

The radiation detection device 100 according to this embodiment has the above arrangement, in which the anode electrodes 106 are arranged in a matrix pattern in the pixel electrode portion 101. The anode electrode 106 exposed on the upper surface of the insulating member 102 forms one pixel. Chronologically analyzing changes in the voltages of electrical signals appearing in the plurality of cathode electrodes 104 and the plurality of anode electrode patterns 108 can specify the positions of pixels that have detected electrons and the detection times of the electrons, thus obtaining electron detection results at the respective pixels. As has been described above, this makes it possible to calculate the track of a recoil electron.

First Embodiment

A Compton camera uses Compton scattering occurring in a gas. However, the probability of Compton scattering in a gas is low. For this reason, a conventional Compton camera using gas amplification exhibits a low detection frequency of γ rays, and hence suffers a low detection speed, resulting in taking much time to obtain a sufficient detection signal.

Figure 4:
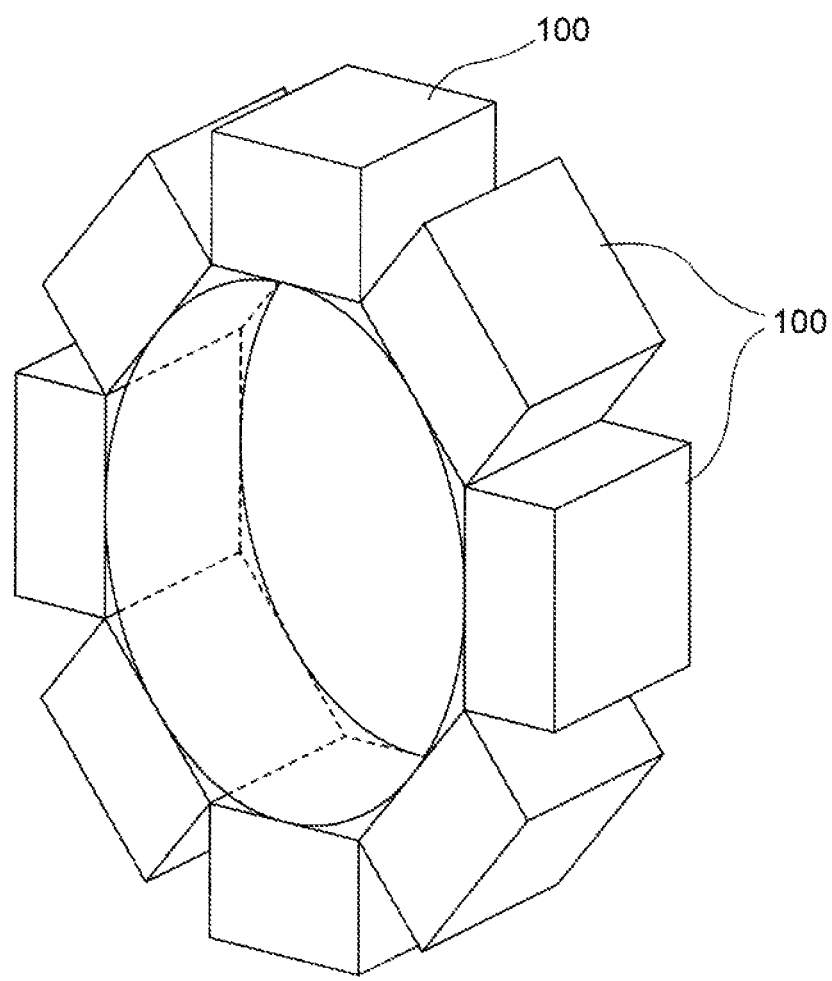
FIG. 4 is a layout view of a radiation detection device according to the first embodiment.

On the other hand, as shown in FIG. 4, a plurality of radiation detection devices 100 according to the first embodiment are laid out annularly. A specimen (radiation source) as a measurement target is placed in the area surrounded by the radiation detection devices 100.

The specimen (radiation source) radially emits γ rays, and hence annularly arranging the plurality of radiation detection devices 100 makes it possible to detect more γ rays. This increases the detection frequency of γ rays. Accordingly, when such devices are applied to medical purposes, it is possible to complete imaging in a time shorter than the body motion cycle of the patient as the specimen. In this case, it is possible to greatly reduce position measurement errors with respect to the specimen (radiation source), which are caused by the body motion of the patient.

In this case, a detection module 202 may be allocated to each radiation detection device 100, or one detection module 202 may be allocated to two or more radiation detection devices 100. When the detection module 202 is allocated to each radiation detection device 100, the detection module 202 is preferably provided to surround the radiation detection device 100 from five directions like the structure shown in FIG. 2B. This makes the detection module 202 placed between the adjacent radiation detection devices 100 serve as a radiation shielding member, and hence the scattered γ rays detected by the detection module 202 can be properly associated with the recoil electrons detected by the radiation detection device 100.

It is also possible to place the detection module 202 on only the bottom surface of the radiation detection device 100 without placing any detection modules 202 on the side surfaces of the radiation detection device 100. In this case, in order to prevent scattered γ rays from entering another radiation detection device 100, a radiation shielding member is preferably placed between the adjacent radiation detection devices 100. For example, lead may be selected as a material for a radiation shielding member.

Discrete chambers 111 are preferably used for the radiation detection devices 100 adjacent to each other in the circumferential direction. This is because using a large-scale chamber continuous in the circumferential direction will make it difficult to manufacture the insulating member 102 and will increase the wiring lengths of cathode electrodes 104 and anode electrode patterns 108 to result in an increase in resistance value.

Using these radiation detection devices 100 and performing arithmetic processing based on detection signals can reconstruct a three-dimensional image and specify the position of the source of radiation that is emitted from a specimen.

Second Embodiment

Figure 5:
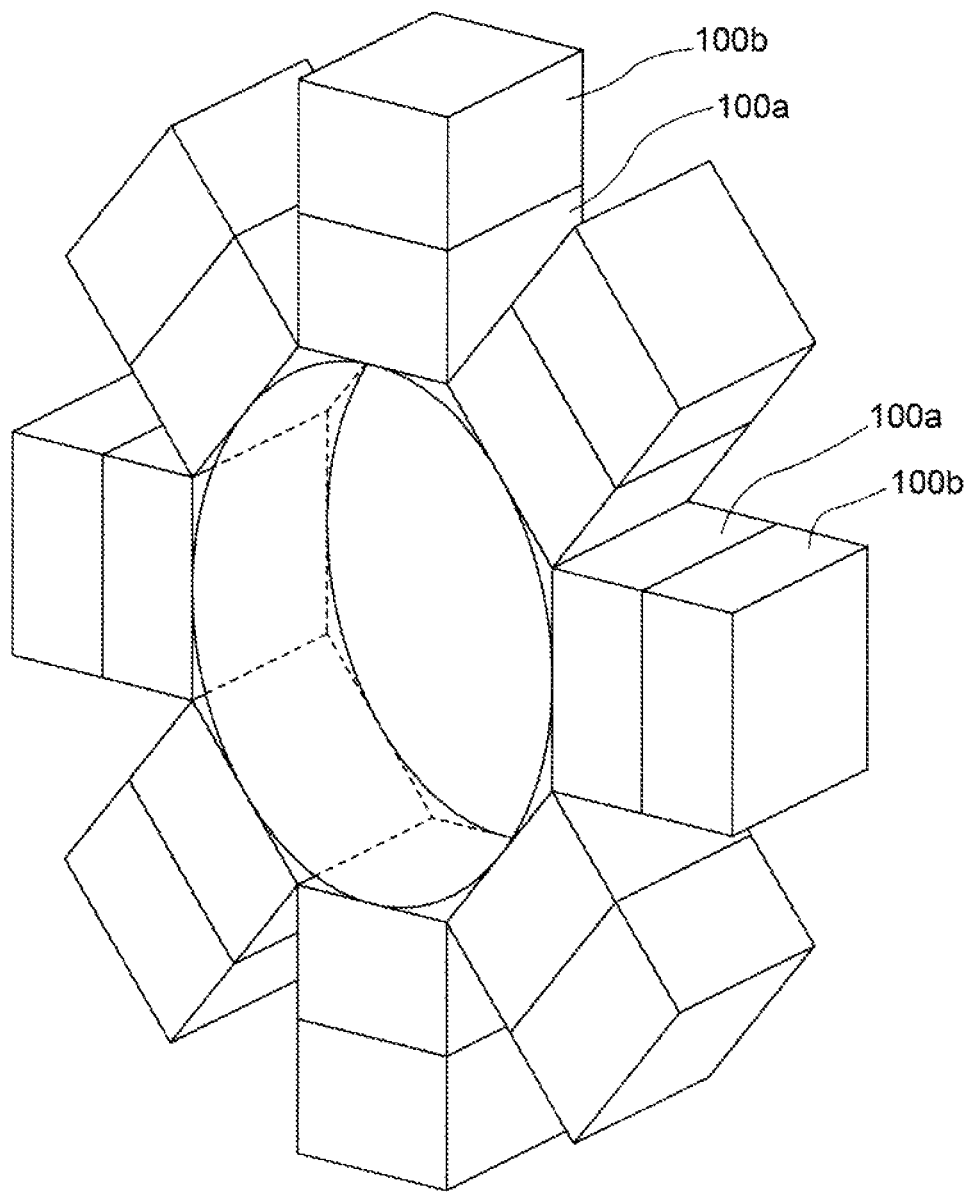
FIG. 5 is a layout view of a radiation detection device according to the second embodiment.

As shown in FIG. 5, a plurality of radiation detection devices 100 according to the second embodiment are laid out in a double-layer annular pattern. That is, a plurality of radiation detection devices 100a constitute a first detection unit surrounding a specimen (radiation source), and a plurality of other radiation detection devices 100b constitute a second detection unit surrounding the outer circumference of the first detection unit. This arrangement makes γ rays transmitted through the first detection unit enter the second detection unit, resulting in an increase in the detection frequency of γ rays.

Figure 6:
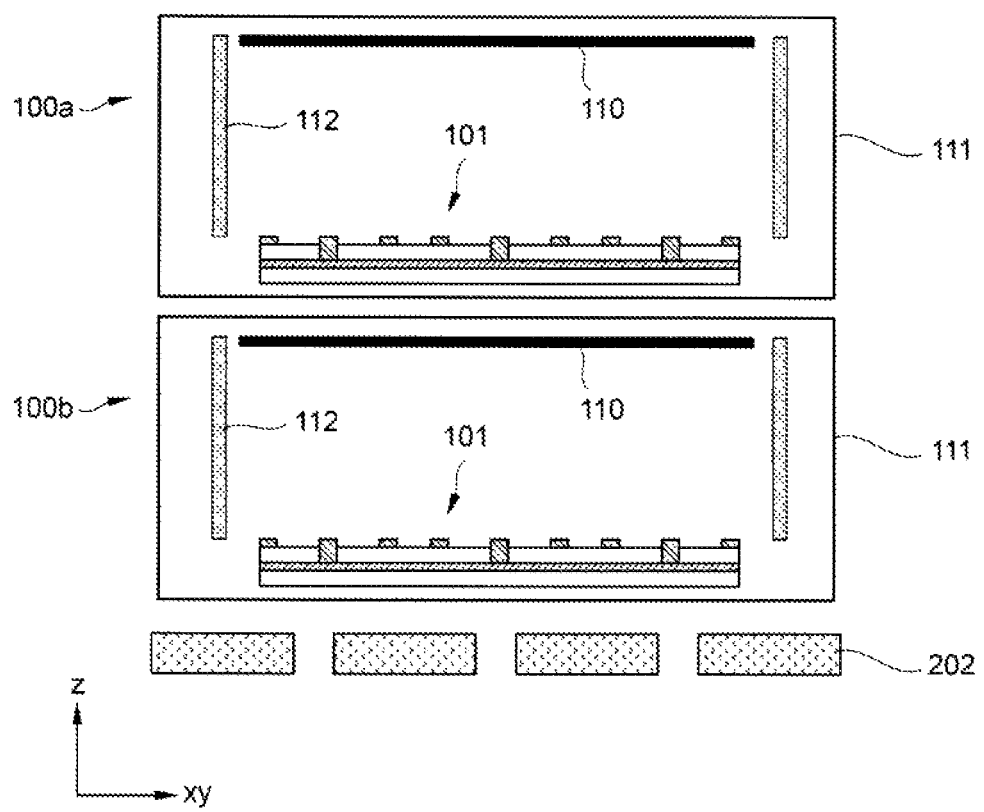
FIG. 6 is a schematic sectional view of the radiation detection device.

FIG. 6 shows the arrangements of the first radiation detection device 100a and the second radiation detection device 100b that are doubly stacked. FIG. 6 shows a mode in which the second radiation detection device 100b is placed outside the first radiation detection device 100a (on the back side of a pixel electrode portion 101). The first radiation detection device 100a and the second radiation detection device 100b each include the pixel electrode portion 101, a drift electrode 110 facing the pixel electrode portion, and a drift cage 112 placed to sandwich the space between the pixel electrode portion and the drift electrode. As shown in FIG. 5, when a plurality of radiation detection devices is stacked on each other, because detection modules 202 are radiation shielding members, the detection modules 202 may not be interposed between the first and second detection units. For example, as shown in FIG. 6, it is possible to use an arrangement in which the detection modules 202 arranged on the bottom surface side of each second radiation detection device 100b constituting the second detection unit, and no detection modules 202 are arranged around each first radiation detection device 100a constituting the first detection unit.

There is conceivable a method of increasing the detection frequency of γ rays by increasing the height of a chamber 111 in the z direction instead of stacking the two radiation detection devices 100. However, increasing the height of the chamber 111 in the z direction will prolong the time taken for electrons constituting an electron cloud to reach the pixel electrode portion 101. This increases the probability that another Compton scattering will occur during this time. Such multiple scattering and a plurality of occurrences of scattering make it difficult to perform data analysis. This also poses the problem that the sampling rate increases, or discharge is caused by ion feedback. In contrast to this, this embodiment uses the two radiation detection devices 100 in a stacked state, and hence can increase the detection frequency of γ rays while preventing the occurrence of multiple scattering.

Third Embodiment

Figure 7:
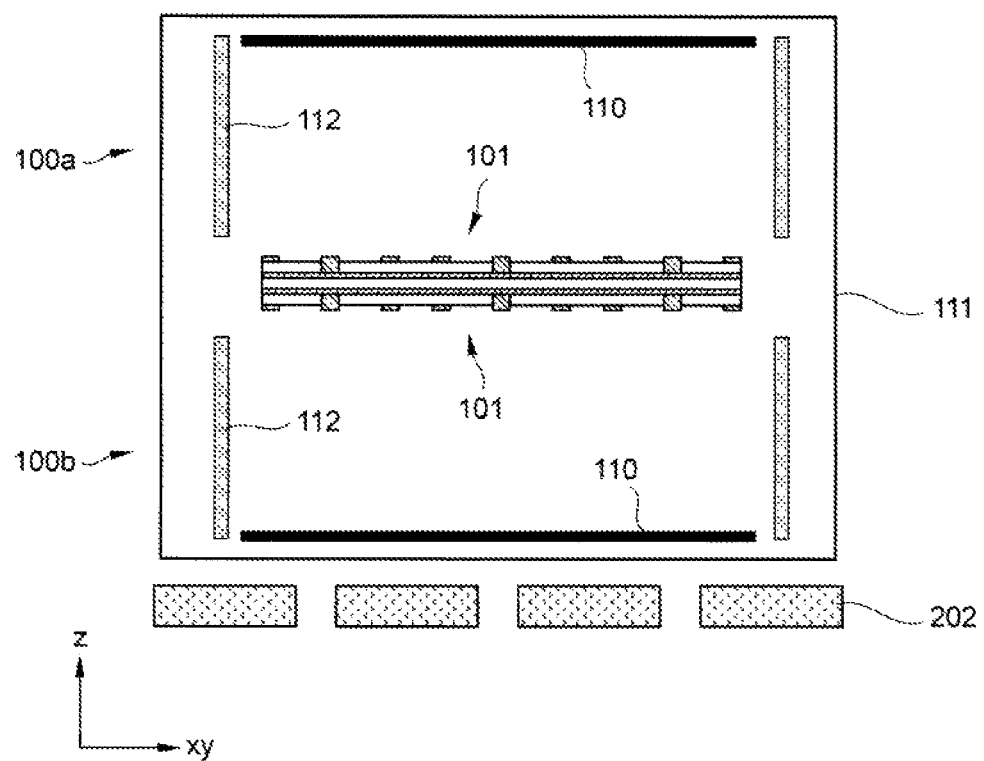
FIG. 7 is a schematic diagram showing an example in which two radiation detection devices are formed in one chamber according to the third embodiment.

As in the second embodiment described above, when two radiation detection devices 100 are stacked on each other, the two radiation detection devices can be formed by using a command chamber. That is, as shown in FIG. 7, a pixel electrode portion 101 is placed at a predetermined position in the z direction in a chamber 111. The two spaces partitioned by the pixel electrode portion 101 are used as the radiation detection devices 100. FIG. 7 shows a mode in which a drift electrode 110 is placed to face the pixel electrode on one surface side on which the pixel electrode portion 101 is placed, and a drift cage 112 is placed to sandwich the space between the drift electrode 110 and the pixel electrode, with a similar arrangement being formed on the other surface side on which the pixel electrode portion 101 is placed (for example, the side where detection modules 202 are arranged).

In this case, two detection units, each having the pixel electrode portion 101 on one surface, may be stacked on each other so as to arrange the pixel electrode portions 101 on the obverse and reverse surfaces or a detection unit having the pixel electrode portions 101 on the two surfaces may be used. FIG. 7 shows an example using the detection unit provided with the pixel electrode portions 101 on the two surfaces. According to this embodiment, because the two radiation detection devices 100 are formed by using one chamber 111, the device arrangement can be simplified. This also contributes to a reduction in cost. In addition, there is no need to perform mechanical positioning with respect to the two upper and lower radiation detection devices 100, and hence more accurate imaging can be implemented.

Figure 8:
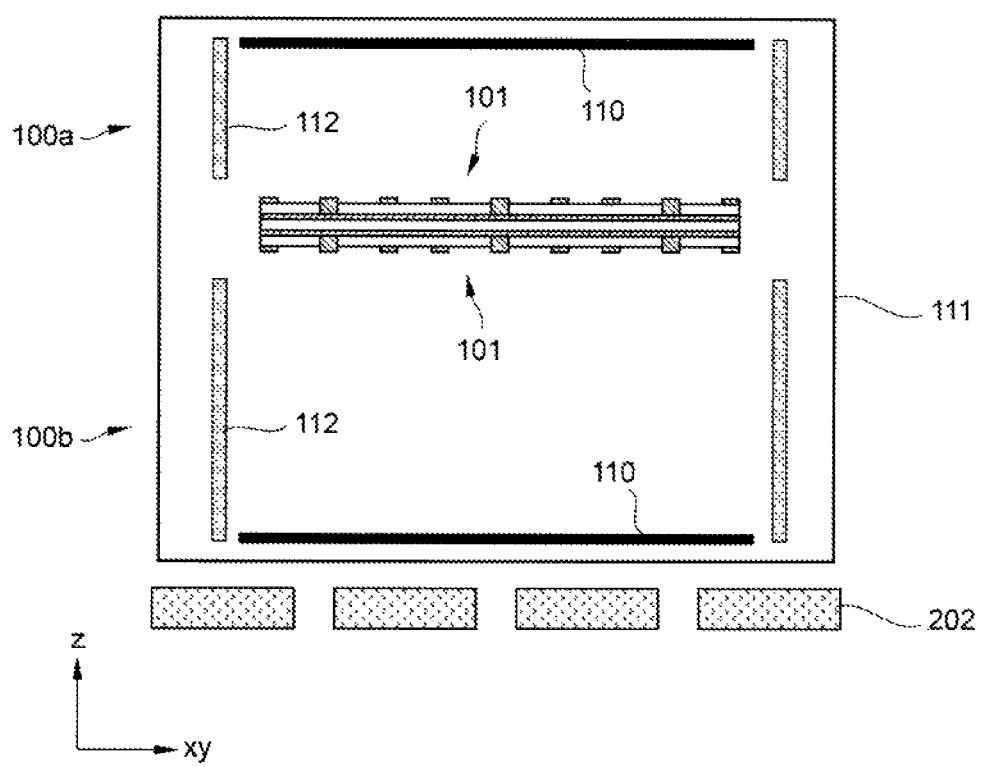
FIG. 8 is a schematic diagram showing another example in which two radiation detection devices are formed in one chamber according to the third embodiment.

Although the insulating member 102 may be provided at an intermediate position in the z direction of the chamber 111, the insulating member 102 may be placed while being offset toward the specimen (radiation source), as shown in FIG. 8. This allocates a wider space in the chamber 111 to second radiation detection devices 100b constituting a second detection unit. Because the dose of γ rays decreases with a distance from a specimen (radiation source), allocating a wider space in the chamber 111 to the remoter second detection unit makes it possible to ensure sufficient detection sensitivity.

Fourth Embodiment

Figure 9:
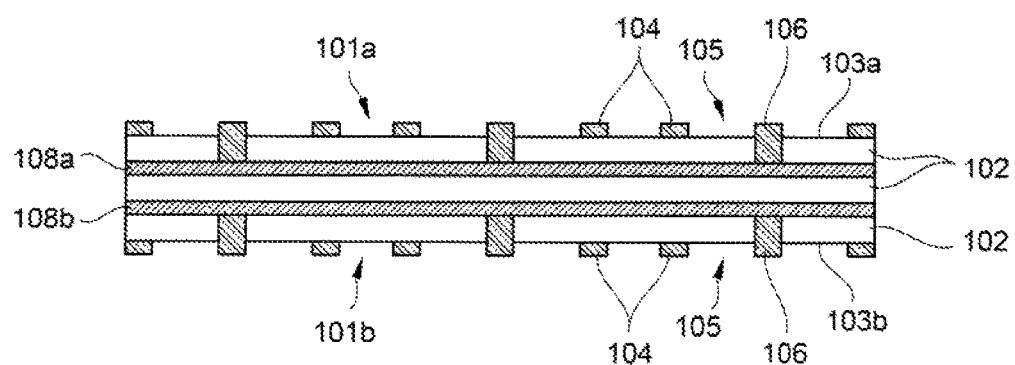
FIG. 9 is a schematic diagram for explaining the structure of an insulating member according to the fourth embodiment.

As an insulating member 102 provided with pixel electrode portions 101 on the two surfaces, the structure shown in FIG. 9 can be adopted. As shown in FIG. 9, a first pixel electrode portion 101a is provided on a first surface 103a of the insulating member 102, and a second pixel electrode portion 101b is provided on a second surface 103b of the insulating member 102. In this case, the first surface is the upper surface facing the specimen (radiation source) side, and the second surface is the lower surface located on the opposite side to the first surface 103a.

In this embodiment, an anode electrode pattern 108a included in the first pixel electrode portion 101a is provided separately from an anode electrode pattern 108b included in the second pixel electrode portion 101b. This makes it possible to individually set anode-cathode voltages at the first pixel electrode portion 101a and the second pixel electrode portion 101b. This makes it possible to individually adjust, for example, the sensitivity of first radiation detection devices 100a constituting a first detection unit and the sensitivity of second radiation detection devices 100b constituting a second detection unit. This further makes it possible to evaluate a change in detection characteristic due to a difference in anode-cathode voltage.

In this embodiment, the plane position of an anode electrode 106 provided on the first surface 103a coincides with the plane position of an anode electrode 106 provided on the second surface 103b.

Fifth Embodiment

Figure 10:
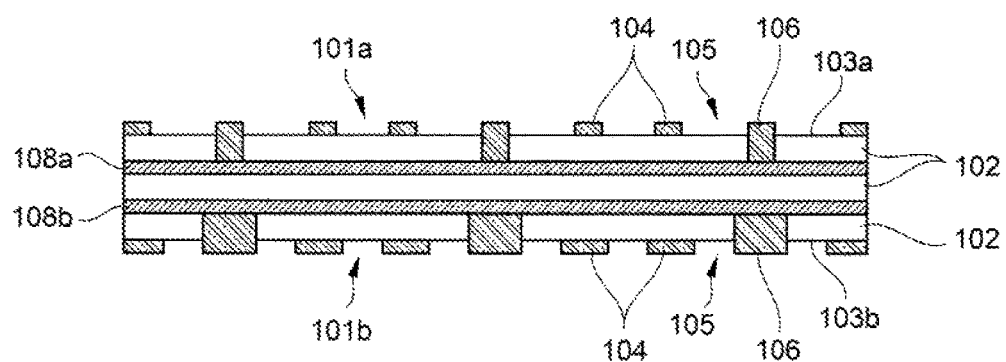
FIG. 10 a schematic diagram for explaining the structure of an insulating member according to the fifth embodiment.

As an insulating member 102 provided with pixel electrode portions 101 on the two surfaces, the structure shown in FIG. 10 can be adopted. In this embodiment, as shown in FIG. 10, an electrode pattern on a first pixel electrode portion 101a differs from an electrode pattern on a second pixel electrode portion 101b. More specifically, the diameter of an anode electrode 106 on the second pixel electrode portion 101b is larger than that of an anode electrode 106 on the first pixel electrode portion 101a. In addition, the opening diameter of an opening portion 105 in the second pixel electrode portion 101b is smaller than that of an opening portion 105 in the first pixel electrode portion 101a.

This can increase the strength of an electric field formed between the anode and the cathode on the second pixel electrode portion 101b relative to the strength of an electric field formed between the anode and the cathode on the first pixel electrode portion 101a, thereby implementing imaging with different sensing characteristics. This also makes it possible to evaluate a change in detection characteristic due to a difference in electrode pattern. Furthermore, it is possible to optimize the first pixel electrode portion 101a and the second pixel electrode portion 101b with respect to difference radiation sources.

Sixth Embodiment

Figure 11:
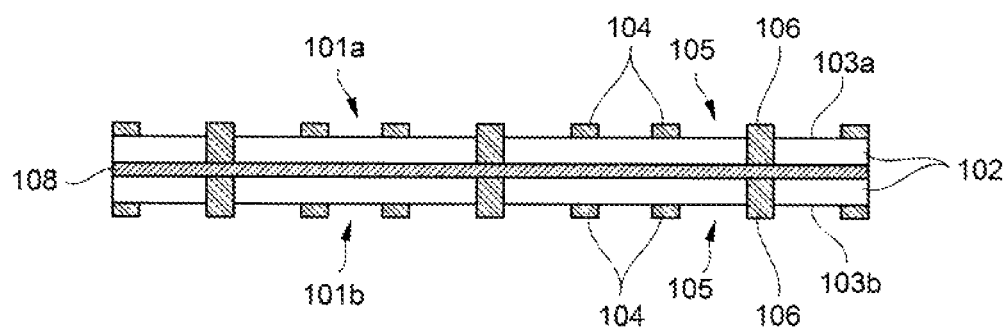
FIG. 11 a schematic diagram for explaining the structure of an insulating member according to the sixth embodiment.

As an insulating member 102 having pixel electrode portions 101 formed on the two surfaces, the structure shown in FIG. 9 can be adopted. In this embodiment, as shown in FIG. 11, an anode electrode pattern 108 is shared between a first pixel electrode portion 101a and a second pixel electrode portion 101b. Other points are the same as those of the structure shown in FIG. 9. Accordingly, the plane position of an anode electrode 106 provided on a first surface 103a coincides with the plane position of an anode electrode 106 provided on a second surface 103b.

This arrangement omits an insulating member between an anode electrode pattern 108a and an anode electrode pattern 108b like that shown in FIG. 9 and FIG. 10, thereby reducing the overall thickness of the insulating member 102. In addition, this can greatly reduce the number of signal wirings. This makes it possible to reduce the size of the circuit of a signal processing system, thus achieving reductions in size and weight. In this embodiment, signals from the obverse and reverse surfaces can be separated from each other by using signals obtained from cathode electrodes 104. Furthermore, according to this embodiment, it is possible to form a through hole through which the anode electrode 106 extends by drilling the insulating member 102.

Seventh Embodiment

Figure 12:
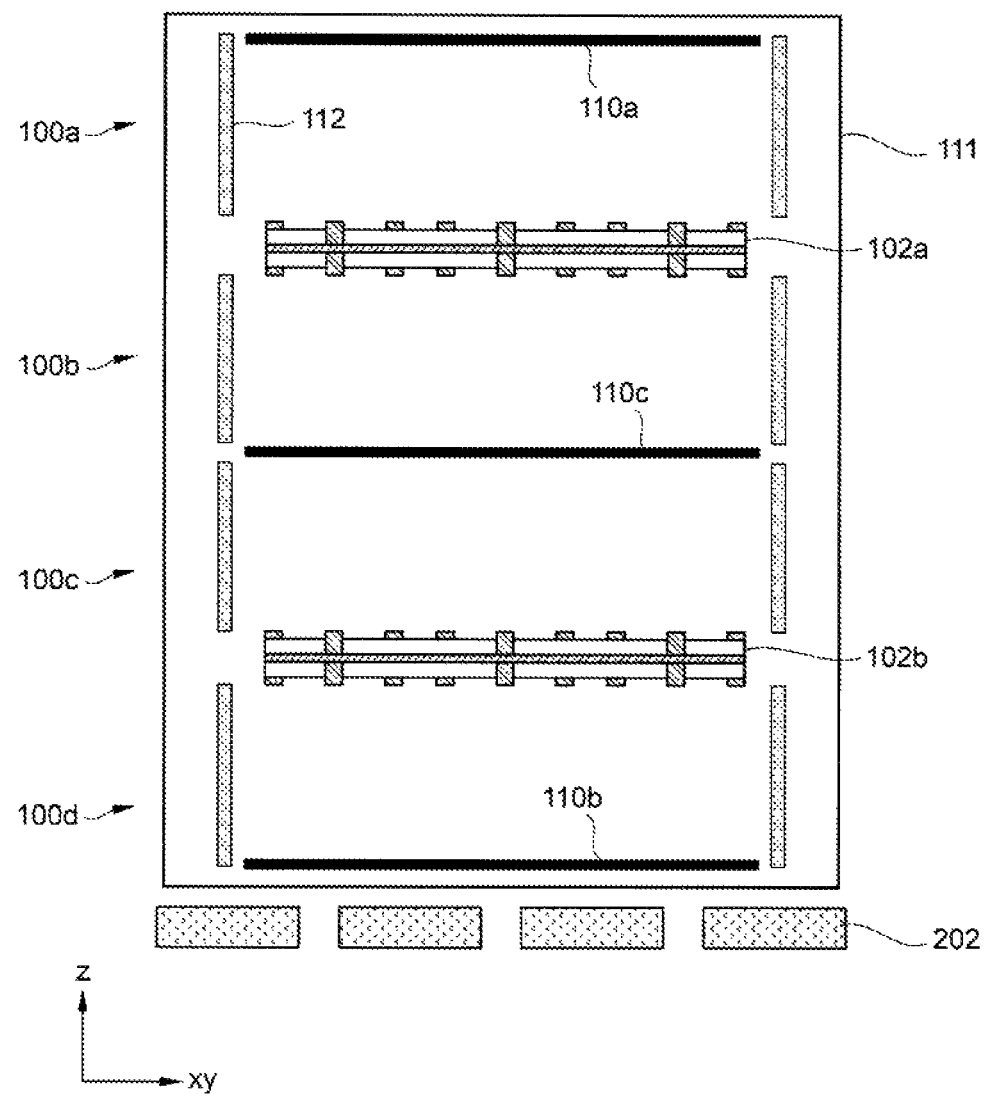
FIG. 12 is a schematic diagram showing an example in which four radiation detection devices are formed in one chamber according to the seventh embodiment.

As shown in FIG. 12, four radiation detection devices 100a to 100d are provided in one chamber 111 according to the seventh embodiment. More specifically, drift electrodes 110a to 110c are arranged at two end positions and an intermediate position in the chamber 111 in the z direction. In addition, an insulating member 102a is placed between the drift electrode 110a and the drift electrode 110c, and an insulating member 102b is placed between the drift electrode 110b and the drift electrode 110c. That is, the drift electrode 110c is shared between the two radiation detection devices 100b and 100c. The insulating members 102a and 102b each have the structure shown in FIG. 11.

This arrangement is configured to partition the space of the chamber 111 into four spaces, and hence the partitioned spaces can be handled as the four radiation detection devices 100a to 100d. Accordingly, when a plurality of sets of such radiation detection devices 100a to 100d, each as a unit, are annularly arranged, a specimen (radiation source) can be surrounded by four-layer radiation detection devices. This can further increase the detection frequency.

Eighth Embodiment

Figure 13:
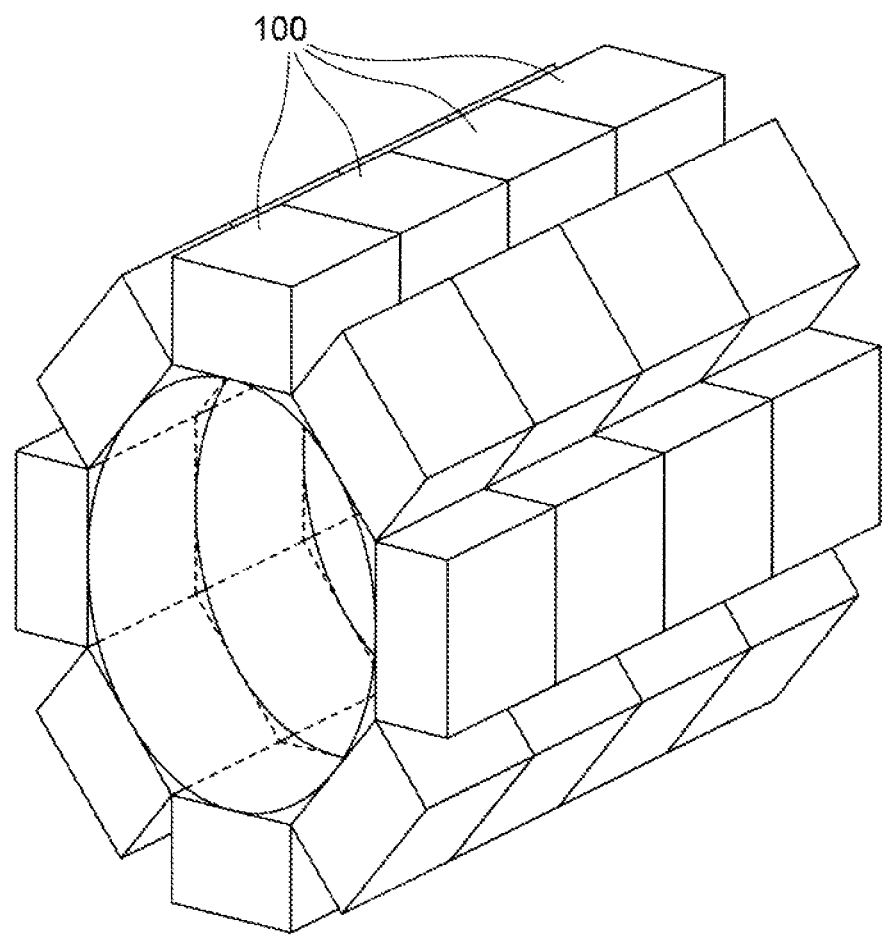
FIG. 13 is a schematic diagram showing an example in which a plurality of single-layer rings are arranged in the axial direction according to the eighth embodiment.
Figure 14:
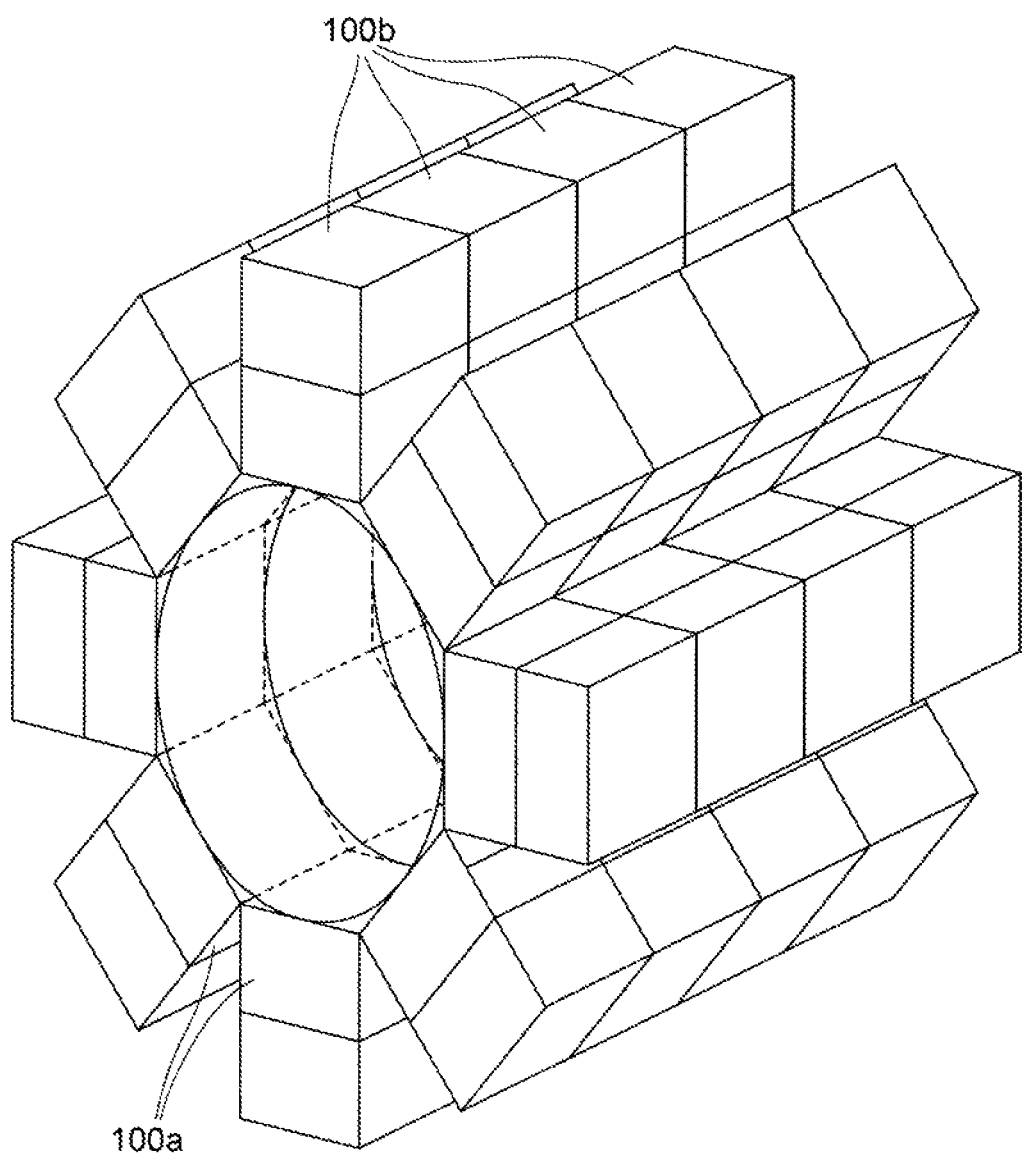
FIG. 14 is a schematic diagram showing an example in which a plurality of double-layer rings are arranged in the axial direction according to the eighth embodiment.

Arranging a plurality of single-layer detection units, each shown in FIG. 4, in the axis direction can form a tubular arrangement having single-layer detection units continuing coaxially, as shown in FIG. 13. In addition, arranging a plurality of double-layer detection units, each shown in FIG. 5, in the axial direction can form a tubular arrangement having double-layer detection units continuing coaxially, as shown in FIG. 14. This can further increase the detection frequency. This arrangement allows a wider range of a specimen to be set as a detection target. Although not shown, a specimen (radiation source) may be spherically surrounded by a plurality of radiation detection devices 100. This arrangement can further increase the detection accuracy.

What is claimed is:

1. A radiation image forming apparatus, comprising:
a detection unit including a plurality of Compton cameras, wherein each of the plurality of Compton cameras comprising:
a radiation detection device that includes a plurality of pixels, each configured to detect an electron generated by a track of a recoil electron generated by Compton scattering, and is configured to output a detection signal configured to specify a position of a pixel that has detected the electron and a time when the pixel has detected the electron, and
a detection module configured to detect an incident position of scattered γ rays generated by the Compton scattering,
wherein the plurality of the Compton cameras arranged annularly to surround a region in which a specimen is placed.

2. The radiation image forming apparatus according to claim 1,
wherein a plurality of the detection units is included, the plurality of the detection units arranged along an axial direction to coaxially surround the specimen.

3. A radiation image forming apparatus, comprising:
a first detection unit including a plurality of first Compton cameras; and
a second detection unit including a plurality of second Compton cameras,
wherein each of the plurality of first Compton cameras and the plurality of second Compton cameras comprising:
a radiation detection device that includes a plurality of pixels, each configured to detect an electron generated by a track of a recoil electron generated by Compton scattering, and is configured to output a detection signal configured to specify a position of a pixel that has detected the electron and a time when the pixel has detected the electron, and
a detection module configured to detect an incident position of scattered γ rays generated by the Compton scattering,
wherein the plurality of first Compton cameras of the first detection unit is arranged annularly to surround a specimen, and the plurality of second Compton cameras of the second detection unit is arranged annularly to surround a specimen, and
wherein the second detection unit is arranged annularly to surround the first detection unit.

4. The radiation image forming apparatus according to claim 3,
wherein a plurality of the first detection units and a plurality of the second detection units are included, the plurality of the first detection units and the plurality of the second detection units are arranged along an axial direction to coaxially surround the specimen.

5. The radiation image forming apparatus according to claim 3,
wherein the radiation detection device includes a chamber into which a gas is introduced, and an insulating member provided in the chamber,
wherein a first radiation detection device included in the first detection unit and a second radiation detection device included in the second detection unit share the chamber and the insulating member, and
wherein a first pixel electrode portion forming the first radiation detection device is provided on a first surface of the insulating member, and a second pixel electrode portion forming the second radiation detection device is provided on a second surface located on an opposite side to the first surface of the insulating member.

6. The radiation image forming apparatus according to claim 5,
wherein the first pixel electrode portion has a first electrode pattern and the second pixel electrode portion has a second electrode pattern, and
wherein the first electrode pattern and the second electrode pattern are different from each other.

7. The radiation image forming apparatus according to claim 5,
wherein the first pixel electrode portion and the second pixel electrode portion each include a plurality of anode electrodes, and
wherein anode electrodes, of the plurality of anode electrodes respectively included in the first pixel electrode portion and the second pixel electrode portion, whose plane positions overlap each other are short-circuited.

8. The radiation image forming apparatus according to claim 3,
wherein the radiation detection device includes a first radiation detection device included in the first detection unit and a second radiation detection device included in the second detection unit and overlapping the first radiation detection device when viewed from the specimen,
wherein the first radiation detection device and the second radiation detection device include a common chamber, a first insulating member and a second insulating member provided in the chamber, and a drift electrode placed between the first insulating member and the second insulating member,
wherein the first insulating member is provided with a first pixel electrode portion forming the first radiation detection device, and
wherein the second insulating member is provided with a second pixel electrode portion forming the second radiation detection device.

* * * * *